(12) United States Patent
Shmelev et al.

(10) Patent No.: US 9,388,927 B2
(45) Date of Patent: Jul. 12, 2016

(54) POLYMER PIPE CONNECTION ASSEMBLY

(71) Applicant: OOO GRUPPA POLYMERTEPLO, Moscow (RU)

(72) Inventors: Aleksandr Yuryevich Shmelev, Moscow (RU); Sergey Vasilyevich Samoilov, Moscow (RU); Arkadiy Moiseevich Degtyarev, Moscow (RU)

(73) Assignee: OOO "GRUPPA POLYMERTEPLO", Moscow (RU)

( * ) Notice: Subject to any disclaimer, the term of this patent is extended or adjusted under 35 U.S.C. 154(b) by 0 days.

(21) Appl. No.: 14/386,274

(22) PCT Filed: Nov. 26, 2012

(86) PCT No.: PCT/RU2012/000977
§ 371 (c)(1),
(2) Date: Sep. 18, 2014

(87) PCT Pub. No.: WO2013/157987
PCT Pub. Date: Oct. 24, 2013

(65) Prior Publication Data
US 2015/0035276 A1    Feb. 5, 2015

(30) Foreign Application Priority Data

Apr. 17, 2012   (RU) ................................ 2012114961

(51) Int. Cl.
*F16L 33/207*   (2006.01)
(52) U.S. Cl.
CPC .................................. *F16L 33/2071* (2013.01)
(58) Field of Classification Search
CPC ..... F16L 33/2071; F16L 33/222; F16L 33/23; F16L 33/207

USPC .................................................. 285/242, 243
See application file for complete search history.

(56) References Cited

U.S. PATENT DOCUMENTS 145,731 A * 12/1873 Edson .................... F16L 33/222
                                                      285/243
371,231 A * 10/1887 Turner .................. F16L 33/222
                                                      285/243

(Continued)

FOREIGN PATENT DOCUMENTS

CA         1319718 C       6/1993
CN         87106907 A      4/1988

(Continued)

OTHER PUBLICATIONS

International Search Report for Chinese Application No. 2012800724430, May 27, 2015.

(Continued)

*Primary Examiner* — David E Bochna
(74) *Attorney, Agent, or Firm* — Marshall, Gerstein & Borun LLP

(57) ABSTRACT

The polymer pipe joint assembly includes a fitting, positioned inside the polymer pipe, a coupling, having at least one cylindrical section, which covers the pipe and fitting, the assembly having a sleeve capable of changing its geometrical dimensions and shape under pressure. The sleeve has at least one cylindrical section placed between the pipe and coupling, the fitting has a shoulder on its outside surface, restricting the movement of the pipe and sleeve, while the inside surface of the coupling has a lead-in chamfer. The change of the dimensions of the sleeve can be performed both by selecting different types of sleeve material or by its construction.

7 Claims, 5 Drawing Sheets

(56) References Cited

U.S. PATENT DOCUMENTS

| | | | | |
|---|---|---|---|---|
| 1,300,956 A * | 4/1919 | Greve | F16L 33/23 | 285/253 |
| 1,532,886 A * | 4/1925 | Cowles | F16L 33/222 | 285/243 |
| 2,034,644 A * | 3/1936 | Walsh | F16L 33/2073 | 285/243 |
| 2,280,892 A * | 4/1942 | Cowles | F16L 33/221 | 285/243 |
| 2,328,013 A * | 8/1943 | Hattan | F16L 33/221 | 285/243 |
| 3,185,500 A * | 5/1965 | Luther | F16L 33/2076 | 285/256 |
| 3,222,091 A * | 12/1965 | Marshall | F16L 33/222 | 285/243 |
| 4,212,487 A * | 7/1980 | Jones | F16L 33/225 | 285/243 |
| 4,564,222 A * | 1/1986 | Loker | F16L 33/18 | 285/243 |
| 4,598,938 A | 7/1986 | Boss et al. | | |
| 5,306,051 A * | 4/1994 | Loker | F16L 33/23 | 285/222.1 |
| 6,749,233 B2 * | 6/2004 | Ohya | F16L 13/146 | 285/243 |
| 7,922,212 B2 * | 4/2011 | Werth | A61M 39/12 | 285/242 |
| 2005/0012328 A1 * | 1/2005 | Baving | F16L 37/0925 | 285/242 |
| 2006/0097518 A1 | 5/2006 | Bott et al. | | |
| 2008/0191475 A1 | 8/2008 | Postler | | |
| 2009/0179422 A1 | 7/2009 | Werth | | |
| 2011/0169262 A1 * | 7/2011 | Sinoplu | F16L 13/141 | 285/242 |

FOREIGN PATENT DOCUMENTS

| | | | |
|---|---|---|---|
| DE | 9007463 U1 | 5/1992 | |
| DE | 10133183 C1 | 11/2002 | |
| DE | 102004026897 A1 | 2/2005 | |
| DE | 102008039446 A1 | 1/2010 | |
| EP | 0 264 010 B1 | 1/1990 | |
| FR | 1044999 A * | 11/1953 | F16L 33/222 |
| RU | 2127394 C1 | 3/1999 | |
| RU | 64318 U1 | 6/2007 | |
| WO | WO-8500646 A1 | 2/1985 | |

OTHER PUBLICATIONS

International Search Report for International Application No. PCT/RU2012/000977, dated Jul. 29, 2013.

* cited by examiner

POLYMER PIPE CONNECTION ASSEMBLY

TECHNICAL FIELD

The invention relates to pipeline transport and pipe fittings and might be used for connecting polymer pipes with each other or with metal pipes, as well as with polymer and metal containers. The joint assembly is preferably used for connecting pipes in hot water and heating pipelines.

BACKGROUND ART

Pipe joint assemblies using plastic sleeves are known from the prior art. Plastic sleeves of such assemblies are used only for mechanical fixing of the pipe and joint elements relative to each other, while impermeability is ensured by using additional sealing element of rubber or some other elastic material. The drawback of such joints is the usage of additional sealing element, which because of the factors coming from the transported media, such as temperature or chemical aggressiveness, could lose its elastic properties or could be destroyed, resulting in damaging of the seal of the joint (Annex to the <<Polymer pipes>> journal, Polymer pipes 2005>> handbook, Volume 1, pages 207-228.).

The closest analogue is pipe joint assembly, comprising fitting situated inside of the pipe, with coupling on the outside surface of the pipe, covering the fitting (Patent RF 64318, MPK F 16L13/007, published 27 Jun. 2007). In order to provide a sealed connection of the pipes, the joint is being compressed over the surface of the fitting, resulting in no necessity to use additional sealing element.

The drawback of the closest analogue is a necessity to prepare ends of the pipes: they have to be widen, in other words—bell-mouth, which leads to increased diameter of the pipe end and consequently to a changed geometry of the pipe end, including its reinforcement system, which subsequentially leads to destruction or weakening of the pipe. "Mouthing" of multilayered pipes may lead to cracking of one or several of their layers resulting in low functionality of these layers, leading to reduced reliability of the joint assembly. This makes the use of polymer pipe joint assemblies more complicated.

DISCLOSURE OF INVENTION

The technical result of the invention comes from improved reliability of the pipe joint assembly due to no tensile strain in the end portions of the pipes being connected, as well as providing for a hermetic joint assembly for the polymer pipes of different types with one another or with metal pipes.

Technical result is achieved due to the fact that joint assembly comprises a fitting, positioned inside the polymer pipe, and a coupling, with at least one cylindrical section, covering the pipe and the fitting, wherein assembly comprises a sleeve adapted to change geometric dimensions and/or shape under pressure, having at least one cylindrical section, positioned between the pipe and the coupling, wherein fitting comprises a shoulder on its outside surface, limiting displacement of the pipe and sleeve, while there is an lead-in-chamfer on the inside surface of the coupling.

Realization of the sleeve with the ability to change geometric dimensions and shape under the impact of pulled over coupling permits to position the coupling over the sleeve with inside diameter being smaller then outside diameter of the sleeve, but bigger or equal to outside diameter of polymer pipe. Wherein the sleeve and the coupling crimp the pipe in such a way, that pipe diameter reduces (both outside and inside), resulting in a tight enclose of the fitting by the pipe and formation of a reliable connection.

Both coupling and sleeve comprise at least one cylindrical section each. Having several sections with diameters decreasing sequentially from the front part to the end part of the sleeve allows to make connections of any required length while providing for a smooth thrusting of the coupling over the sleeve, finally resulting in a reliable connection of the polymer pipe with another polymer or metal pipe.

Coupling lead-in chamfer allows pushing the coupling over the sleeve, while shoulder of the fitting does not allow uncontrollable disposition of the sleeve, pipe and coupling relative to the fitting, thus improving reliability of the joint assembly.

The number of coupling sections may be greater than the number of sections of the sleeve, and vice versa, the number of sections of the sleeve could be greater than the number of sections of the coupling. If the number of sections of the coupling is greater than the number of sections of the sleeve, an additional section of the coupling prevents stretching of reinforced fibers out of the joint assembly when connecting reinforced polymer pipe, which has a positive effect on the joint reliability. Conversely, if sleeve has more sections than coupling, an additional section of the sleeve protects fibers from stretching out.

Resizing of the sleeve may be achieved with both by the choice of sleeve material, and via its construction. Such construction allows pulling coupling over the sleeve with a special instrument without the increase of force, applied to the coupling while pulling the coupling over the sleeve.

In particular embodiments of the present utility model it is possible to make the sleeve of the joint assembly of a material capable to change geometric dimensions and/or shape under pressure, in particular of polyolefin, and preferably of polyethylene or polypropylene.

Also in particular embodiments of the sleeve construction may comprise cuts and/or grooves along the sleeve axis. In this case it shall be possible to make the sleeve of hard polymer materials, which do not change geometric dimensions and shape, for example of polyamide or polyphenylene sulfide or polyacetal or a metal, for example brass, bronze or stainless steel. In this case changes in dimension and/or shape of the sleeve could be achieved with provided cuts and grooves, or combination of cuts and grooves.

Inside surface of the sleeve may have at least one conical ring groove preventing backward movement of the sleeve relative to the pipe, eventually improving the joint reliability.

The sleeve may be made of several cylindrical sections of a different outside diameter, gradually decreasing from the front to the back end of the sleeve, coupled together with conical sections, while outside surface of the end section may have a chamfer. The presence of conical sections and chamfer provides for the coupling smooth move in relation to the sleeve and prevents sleeve destruction during assembling of the joint assembly, thus improving reliability of the joint in general.

The coupling may consist of several cylindrical sections with different inside diameters, decreasing from the front to the end part of the coupling, coupled together with conical sections, wherein lead-in chamfer is arranged on the inside surface of the front cylindrical section. Such coupling arrangement allows smooth pull of the coupling over the sleeve, which under the pressure of the coupling changes its geometric dimensions and shape. As a result the coupling firmly encloses the fitting, pipe and sleeve, without destroying the sleeve and improving reliability of the joint assembly.

Inside surface of the coupling might have a conical ring groove coupled with the lead-in chamfer forming together a sharp edge. In this case sleeve material fills in the groove when being assembled, preventing backward disposition of the coupling relative to the sleeve, thus improving reliability of the joint.

Fitting shoulder may comprise a ring groove on its butt-end surface, into which pipe and sleeve abut, used for placing polymer pipe end and sleeve in order to fix their position during assembling of the assembly and to protect the ends from being destructed when contacting fitting shoulder. The groove is especially important when connecting reinforced pipe, as ends of reinforcing fibers are fixed inside of the groove, which prevents them from stretching out, thus improving joint reliability.

Outside surface of the fitting part which is inserted into the pipe may have ring grooves. Said grooves are filled with polymer pipe material after placing of the coupling over the sleeve, thus providing additional clutch between the pipe and the fitting.

BRIEF DESCRIPTION OF THE DRAWINGS

The essence of the invention is explained through the Figures.

Figure 1:
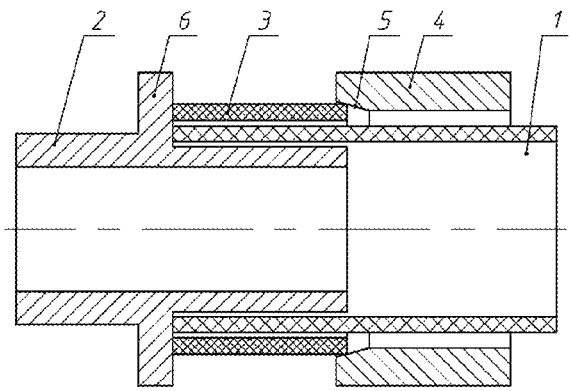
FIG. 1 shows a longitudinal section of the joint assembly before being assembled.

The joint assembly comprises a pipe 1, with fitting 2 located inside. A sleeve 3 covered with the coupling 4 is placed on the outside surface of the pipe 1. Inside surface of the coupling 4 comprises a lead-in chamfer 5, and shoulder 6 on the outside surface of the fitting.

Figure 2:
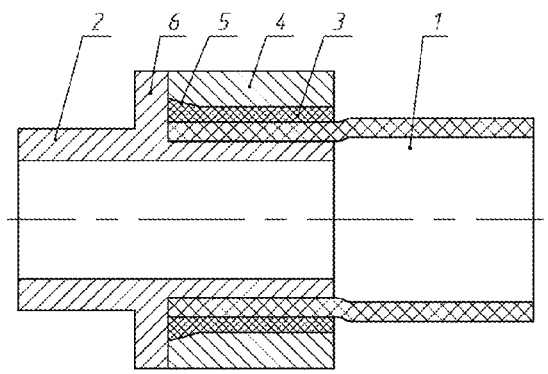

FIG. 2 shows joint assembly in its assembled state.

Figure 3:
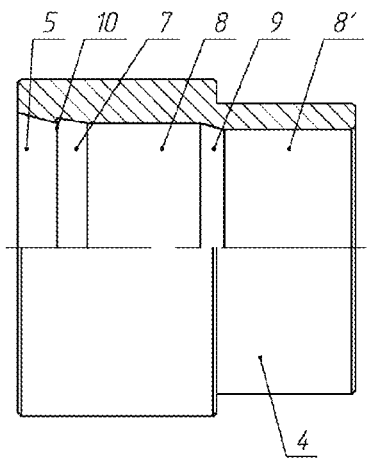

FIG. 3 shows cross section of the coupling 4 in a preferred embodiment. Coupling 4 comprises lead-in chamfer 5, conical ring groove 7, cylindrical sections: front—8 and end—8', connected with a conical section 9. Position 10 denotes the sharp edge, formed by the groove 7 and lead-in chamfer 5.

Figure 4:
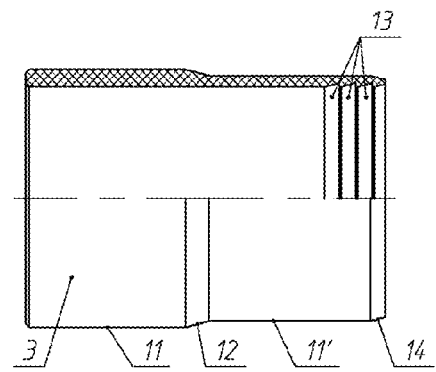

FIG. 4 shows cross section of the sleeve 3 of an embodiment, comprising cylindrical sections: front—11 and end—11', connected by a conical section 12. Inside surface of the sleeve comprises conical ring grooves 13. 14 is end chamfer of sleeve 3.

Figure 5:
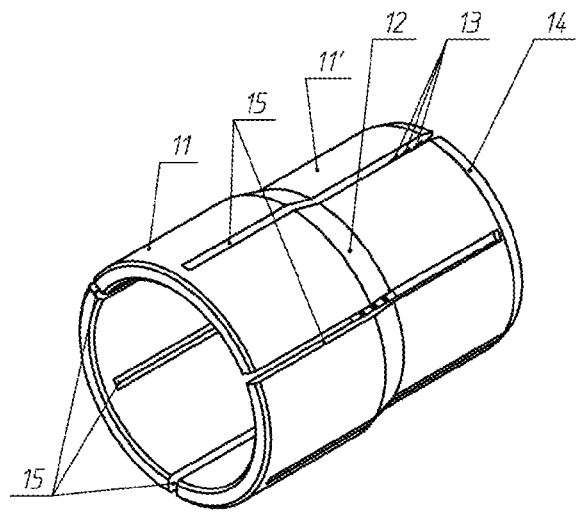

FIG. 5 shows axonometric view of the sleeve 3 in another embodiment. Position 15 denotes cuts on the sleeve surface, allowing it to change its geometric dimensions and shape under the impact of pulled over coupling 4.

Figure 6:
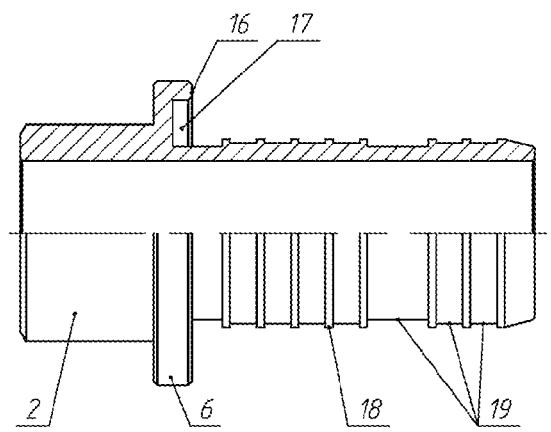

FIG. 6 shows cross section of the fitting 2 in one of the embodiments. Shoulder 6 of the fitting 2 comprises ring groove 17 at the butt-end surface 16, where pipe 1 and sleeve 3 abut, wherein the butt-end of polymer pipe 1 and the butt-end of sleeve 3 are placed when assembling the joint for fixing their position in the assembled joint and preventing their butt-end sides from destruction when contacting shoulder 6 of the fitting 2. Outside surface 18 of the part of the fitting which is inserted into pipe 1 comprises ring grooves 19.

Figure 7:
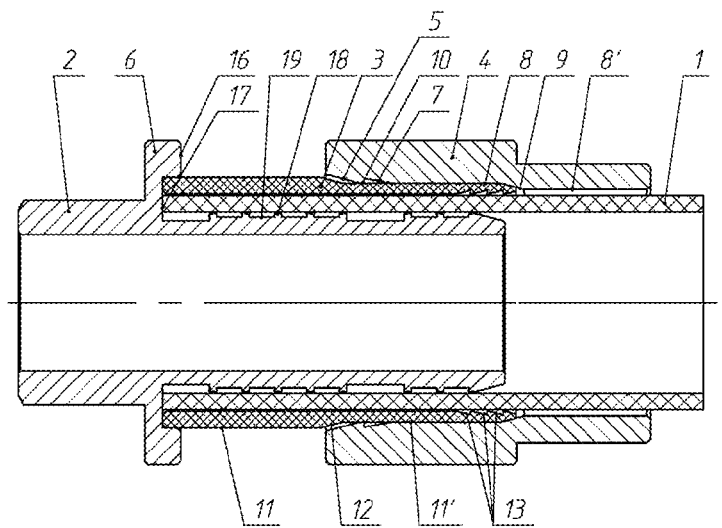
Figure 8:
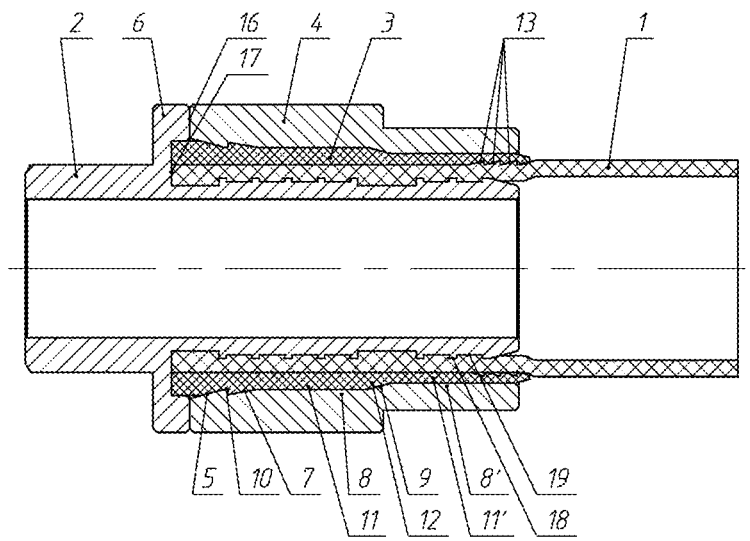

FIG. 7 shows cross section of the joint assembly before assembling in one preferred embodiment, while FIG. 8 shows it after it has been assembled.

Figure 9:
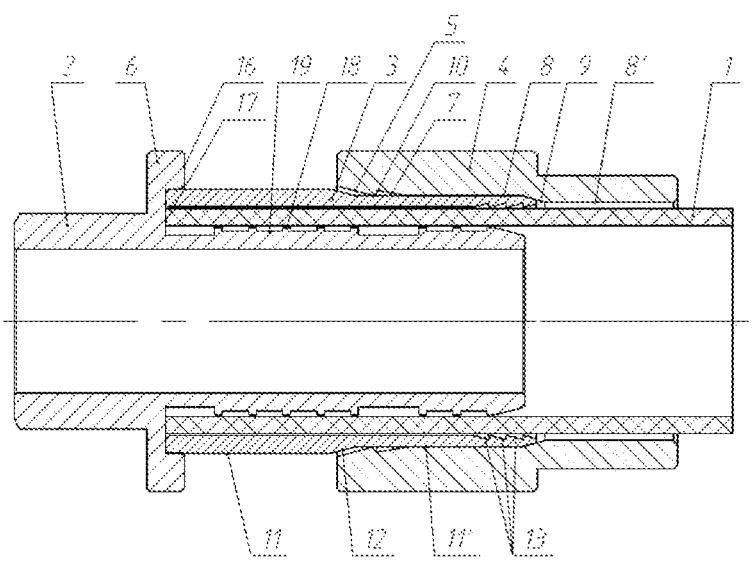
Figure 10:
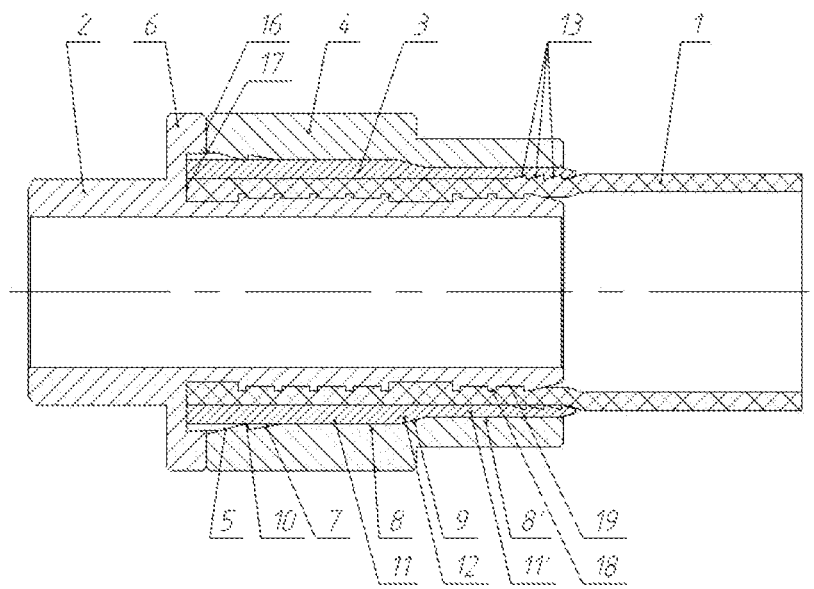

FIG. 9 shows cross section of the joint assembly before assembling in another preferred embodiment, while FIG. 10 shows it after it has been assembled.

Figure 11:
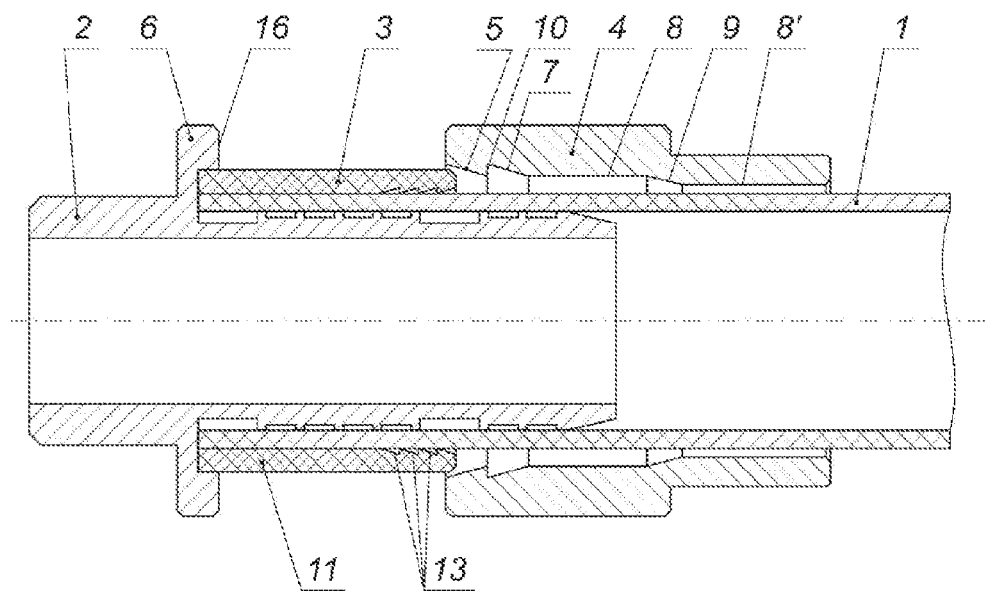

FIG. 11 shows a cross-section of a joint assembly in which a coupling thereof has a greater number of sections than a sleeve.

INVENTION IMPLEMENTATION

Mounting of the pipes using joint assembly of the present invention is shown in FIGS. 1 and 2 and is performed as follows.

Firstly the coupling 4 is placed over the pipe 1 in such a way, that lead-in chamfer 5 faces pipe connection, and then sleeve 3. Fitting 2 is inserted into pipe 1 and then coupling 4 is pushed over the pipe with correctly positioned connection sleeve 3 using a special press with stops at the shoulder of the fitting. The pipe is pressed hard enough in order to tightly cover the fitting.

In different embodiments, the sleeve 3 and coupling 4 may comprise one or several cylindrical sections of different diameters, decreasing from the front to the end part of the sleeve. Cylindrical sections are connected by a conical section. Such placement of the sleeve and coupling increases smoothness of the movement when coupling is moved over the sleeve.

Mounting of the joint assembly in one of the preferred embodiments by using coupling and sleeve, each of which consists of two cylindrical sections, while the sleeve is made of a polymer material able to change its geometric dimensions and shape under the pressure, is shown in FIGS. 7 and 8, and is carried out as follows.

Coupling 4 with a lead-in chamfer 5 and conical groove 7 is placed over the pipe 1 in such a way, that the lead-in chamfer 5 and front section 8 of the coupling 4 are turned towards the connection of the pipe 1 with another pipe or container. Then polyolefin sleeve 3 with conical ring grooves on the inside surface of the end part is placed over the pipe 1. The sleeve is positioned in such a way, that the front cylindrical section 11 of the sleeve 3 faces pipe connection. Fitting 2 is inserted into the pipe 1 in such a way, that the butt-end of pipe 1 enters ring groove 17 on the butt-end surface 16 of the fitting shoulder. Outside surface 18 of the fitting 2 comes into contact with the inside surface of the pipe 1. Ring grooves 19 are made on the outside surface 18. The sleeve 3 is placed in such a way, that butt-end surface of the front section 11 of the sleeve 3 is positioned inside the ring groove 17. Then coupling 4 is pushed over the sleeve 3 from the side of the end section 11 of the sleeve using special press with stops at the shoulder 6 of the fitting 2; the sleeve 3 changes its geometric dimensions and shape when contacting the coupling 4. This results in that the material of sleeve 3 fills lead-in chamfer 5 and conical ring groove 7 of the sleeve 4 and projections are formed on the outside surface of the sleeve, outside surface of these projections is coupled with the inside surfaces of the lead-in chamfer 5 and conical ring groove 10. Said projections prevent a backward shift of the coupling relative to the sleeve, thus improving the joint reliability.

Pipe 1 is compressed under the impact of the coupling 4 so that to cover tightly the fitting 2. At the same time the material of the polymer pipe fills ring grooves 13 at the end part of the sleeve forming projections on the pipe surface shaped like saw teeth, which prevent the movements of the sleeve relative to the pipe and fitting. As a result from the fitting 2 being compressed by the pipe 1, the pipe material fills the grooves 19 forming tight joint between the fitting and the pipe, preventing a backward shift of the fitting and ensuring a reliable and sealed joint assembly.

Mounting of the joint assembly in another preferred embodiment by using coupling and sleeve, each comprising of two cylindrical sections, while the sleeve comprises cuts and grooves along the sleeve axis and is made of metal, is shown in FIGS. 9 and 10, and is carried out as follows.

A coupling 4 with a lead-in chamfer 5 and a conical ring groove 7 is places over the pipe 1 in such a way, that the lead-in chamfer 5 and front section 8 of the coupling 4 face connection of the pipe 1 with another pipe or container. Then, metal sleeve 3, comprising conical ring grooves on its end part, is placed over the pipe 1. The sleeve is being placed in such a way, that front cylindrical section 11 of the sleeve 3 faces pipe connection. The fitting 2 is placed inside the pipe 1 in such a way, that pipe 1 butt-end enters ring groove 17 of the butt-end 16 of the fitting 2 shoulder. Outside surface 18 of the fitting 2 comes into contact with the inside surface of pipe 1. Outside surface 18 of the fitting 2 comprises ring grooves 19. The sleeve 3 is placed in such a way, that the butt-end surface of the sleeve 3 front section 11 is placed into the ring groove 17. Then the coupling 4 is pushed over the sleeve 3 from the side of the end section 11 of the sleeve using special press with stops at the shoulder 6 of the fitting 2, interaction of the coupling 4 with the sleeve 3 changes geometric dimensions and shape of the latter because the walls of the cuts and grooves situated along the sleeve axis come closer to each other under the pressure of the coupling. With this arrangement of the sleeve there is no need to use the special press for pushing the coupling over the sleeve. Under the compression of the coupling 4, the pipe 1 compresses so that to cover tightly the fitting 2. At the same time polymer pipe material fills ring grooves 13 of the sleeve 3 end part, and projections appear on the pipe surface shaped like saw teeth, which prevents the movements of the sleeve relative to the pipe and fitting. As a result from the fitting 2 being compressed by the pipe 1, the pipe material fills ring grooves 19 and forms tight joint between the fitting and the pipe, preventing a backward shift of the fitting and ensuring the sealing of the joint assembly.

In the case when coupling comprises more cylindrical sections then the sleeve, the front section 8 of the coupling 4 is pushed over the sleeve, while the end section 8' is positioned with a gap relative to the polymer pipe 1. When hot water or other hot transported media travels through the pipe, the pipe 1 expands under the pressure and presses against the inside surface of the coupling 4 end section. Such an embodiment prevents axial shift of the coupling relative to the fitting and the pipe, thus improving the joint reliability. When a reinforced polymer pipe is connected, such coupling construction also prevents stretching out of reinforcing fibers, thus allowing improving joint reliability, strength and durability.

The joint assembly permits to produce fitting of any necessary length, and assemble the joint in one pass of a special instrument. Standard equipment without any additional adaptation might be used to assemble the assembly.

Implementation of the utility model may be illustrated by the following examples:

Example 1

The joint assembly comprises a fitting inside the polymer pipe and a coupling with one cylindrical section, covering the pipe and fitting, and a sleeve of polyacetal with one cylindrical section having cuts in its outside surface.

The tests revealed that after assembling the joint assembly a sealed joint of a polymer pipe with another polymer pipe is formed, with no possibility for a backward shift of the coupling and sleeve relative to the fitting. When assembling the joint assembly, no expansion of the pipe end, or a damage to its functional layers occurs, which improves the joint reliability.

Example 2

Joint assembly comprises a fitting situated inside of a reinforced polymer pipe, and a coupling with two cylindrical sections covering the pipe and fitting, and a sleeve of polypropylene with one cylindrical section. There is a ring groove over the butt surface of the fitting shoulder.

Results of the tests of the assembled joint assembly of reinforced polymer pipe with a metal pipe revealed a sealed joint with pipe and sleeve butts placed in the ring groove of the fitting butt. Hot water passing through the pipe expands the pipe which presses to the coupling cylindrical end section. Use of such joint assembly prevents polymer pipe reinforcement layer from destruction, thus improving the joint reliability.

These examples show possible uses of the joint assembly but do not cover all possible embodiments of the present invention.

What is claimed is:

1. A polymer pipe joint assembly comprising a fitting positioned inside of the polymer pipe, and a coupling over the pipe and fitting, the coupling comprising several cylindrical sections of different inside diameter, decreasing from a front towards an opposite end part of the coupling, coupled to each other with conical sections, wherein a lead-in chamfer is formed on an inside surface of a front cylindrical section of the several cylindrical sections, wherein the assembly has a sleeve positioned between the pipe and the coupling and comprises several cylindrical sections with different outside diameter, decreasing from a front towards an opposite end part of the sleeve, coupled to each other with conical sections, wherein there is a chamfer on the outside surface of the end part, wherein the sleeve is made of hard polymer materials and a plurality of cuts and grooves included along a sleeve axis, providing a change of at least one of geometric dimensions or shape of the sleeve, the fitting having a shoulder on its outside surface, which restricts movement of the pipe and sleeve.

2. The assembly according to claim 1, a number of cylindrical sections of the coupling being greater than a number of cylindrical sections of the sleeve.

3. The assembly according to claim 1, a number of cylindrical sections of the sleeve being greater than a number of cylindrical sections of the coupling.

4. The assembly according to claim 1, at least one conical ring groove being formed on an inside surface of the sleeve.

5. The assembly according to claim 1, the inside surface of the coupling having a conical ring groove, coupled with the lead-in chamfer to form a sharp edge.

6. The assembly according to claim 1, a ring groove being included on a butt-end surface of the fitting shoulder, where the pipe and sleeve abut.

7. The assembly according to claim 1, the hard polymer materials including one of polyamide, polyphenylene sulfide, or polyacetal.

\* \* \* \* \*